United States Patent [19]

Robinson et al.

[11] 4,310,132
[45] Jan. 12, 1982

[54] FUSELAGE STRUCTURE USING ADVANCED TECHNOLOGY FIBER REINFORCED COMPOSITES

[76] Inventors: Robert A. Frosch, Administrator of the National Aeronautics and Space Administration, with respect to an invention of Robert K. Robinson, Mercer Island; Harry M. Tomlinson, Bellevue, both of Wash.

[21] Appl. No.: 878,540
[22] Filed: Feb. 16, 1978
[51] Int. Cl.³ .......................... B64C 1/06; B64C 1/12
[52] U.S. Cl. .................................. 244/119; 244/123; 244/132
[58] Field of Search .................. 244/117 R, 119, 120, 244/123, 131–133; 428/375, 404, 457, 538, 902; 416/230 R, 230 A

[56] References Cited

U.S. PATENT DOCUMENTS

| 2,367,750 | 1/1945 | Berkow et al. | 244/123 |
|---|---|---|---|
| 2,997,262 | 8/1961 | Kirk et al. | 244/123 |
| 3,018,832 | 1/1962 | Prewitt | 416/230 A |
| 3,071,217 | 1/1963 | Gould | 244/119 |
| 3,490,983 | 1/1970 | Lee | 244/119 |
| 3,886,647 | 6/1975 | Alexander | 416/230 |
| 3,915,781 | 10/1975 | Novak et al. | 416/230 |
| 3,946,127 | 3/1976 | Eisenmann et al. | 244/133 |
| 3,976,269 | 8/1976 | Gupta | 244/119 |
| 3,995,080 | 11/1976 | Cogburn et al. | 244/123 |
| 4,012,549 | 3/1977 | Slysh | 428/902 |
| 4,113,910 | 9/1978 | Loyd | 244/131 |
| 4,120,998 | 10/1978 | Olez | 244/132 |

FOREIGN PATENT DOCUMENTS

| 343617 | 10/1936 | Italy | 244/119 |
|---|---|---|---|
| 830072 | 3/1960 | United Kingdom | 244/119 |

OTHER PUBLICATIONS

Webb et al., "Retort Braze Bonding of Borsic Al. Comp. Sheet to ti". Jun. 1975, NASA-CR-132730.
Bonn, "Joining of Fiber Reinforced Al. by Diffusion Bonding", 1975, Avail. NTIS, DOKZENTBw DM30.00

Primary Examiner—Galen L. Barefoot
Attorney, Agent, or Firm—Howard J. Osborn; John R. Manning

[57] ABSTRACT

A fuselage structure is disclosed in which the skin is comprised of layers of a matrix fiber reinforced composite, with the stringers reinforced with the same composite material. The high strength to weight ratio of the composite, particularly at elevated temperatures, and its high modulus of elasticity, makes it desirable for use in airplane structures.

25 Claims, 6 Drawing Figures

FUSELAGE STRUCTURE USING ADVANCED TECHNOLOGY FIBER REINFORCED COMPOSITES

ORIGIN OF THE INVENTION

The invention described was made in the performance of work under a NASA contract and is subject to the provisions of Section 305 of the National Aeronautics and Space Act of 1958, Public Law 85-586 (72 STAT. 435; 42 USC 2457).

BACKGROUND OF THE INVENTION

This invention relates to a fuselage structure having a skin comprised of layers of matrix fiber reinforced composites and stringers reinforced with the same material.

DESCRIPTION OF THE PRIOR ART

The use of laminated material and composite material for fabrication of aircraft parts is well known. This type of material is used for certain aircraft parts because of its great strength and rigidity. An early patent in this area teaches the use of thin strips of veneer, wound around a mold in layers of alternating steep pitch angles and shallow pitch angles, to form an aircraft fuselage. These strips of veneer are preferably bound with a waterproof glue. After assembly, the mold is removed and the fuselage structure is sanded and painted as necessary. This type of fuselage does not have stringer or frame supports.

Later patents on this subject teach the use of wood veneer at various grain orientations to better utilize its strength characteristics and the use of layers of fabric in combination with the wood veneer. None of the patents using cloth or wood veneer in a laminated fuselage teach the use of frames or stringers, reinforced or otherwise.

Other patents teach the use of fiber reinforced plastic composites for parts of aircraft structure. Some of the fibers used have been glass fibers, graphite fibers, or boron fibers, embedded in a plastic matrix. The high strength of the composite is due to the transmittal of fiber characteristic to the plastic matrix which in turn protects and unifies the fibers. The axis of the fiber orientation is varied between layers to take advantage of the anisotropic properties of the fibers. However, none of the described plastic composite structures or wood veneer composite structures have the necessary characteristics to be useful as a structural material under conditions expected to be encountered by a supersonic transport.

It is therefore an object of the present invention to provide a fuselage structure with a high strength to weight ratio capable of withstanding conditions expected to be encountered during supersonic flight.

It is another object of the present invention to provide an aircraft structure comprised of parts made from fiber composite matrix materials combined to optimally employ their high strength/weight ratio and anisotropic rigidity while distributing stress smoothly throughout the structure.

A further object of the present invention is to provide a structure constructed in such a manner that there is a minimum of fasteners through load-bearing material.

An additional object of the present invention is to provide a fuselage structure comprised of a skin of layers of matrix fiber reinforced composite oriented in alternate layers at 45° and 315° to the fuselage longitudinal axis.

Yet another object of the present invention is to provide a fuselage structure with high strength, lightweight stringers, reinforced with matrix fiber reinforced composite oriented at 0° with respect to the fuselage longitudinal axis.

SUMMARY OF THE INVENTION

The present invention comprises a fuselage structure wherein the external skin is constructed of layers of matrix fiber reinforced composite. The plies of the composite material are built up so as to take advantage of the unidirectional properties of strength and stiffness of the composite material.

In the preferred embodiment of the invention the composite material has alternate plies oriented at approximately 45° and approximately 315° to the fuselage longitudinal axis. Additional bands of the composite material, oriented at approximately 90° to the fuselage longitudinal axis, are located on the skin between the frames.

The stringers, which run longitudinally and support the skin, are reinforced with layers of matrix fiber reinforced composite material. The composite material reinforcing the stringers is oriented at approximately 0° relative to the fuselage longitudinal axis and runs lengthwise on the stringers, which are also oriented at 0° relative to the fuselage longitudinal axis.

The matrix fiber reinforced composite used in the preferred embodiment is borsic aluminum. Borsic aluminum is comprised of silicone coated boron fibers embedded in an aluminum matrix. The use of the borsic aluminum composite in the fuselage structure as described above, results in a significant weight reduction compared to a similar fuselage of titanium.

DESCRIPTION OF THE PREFERRED EMBODIMENT

Figure 1:
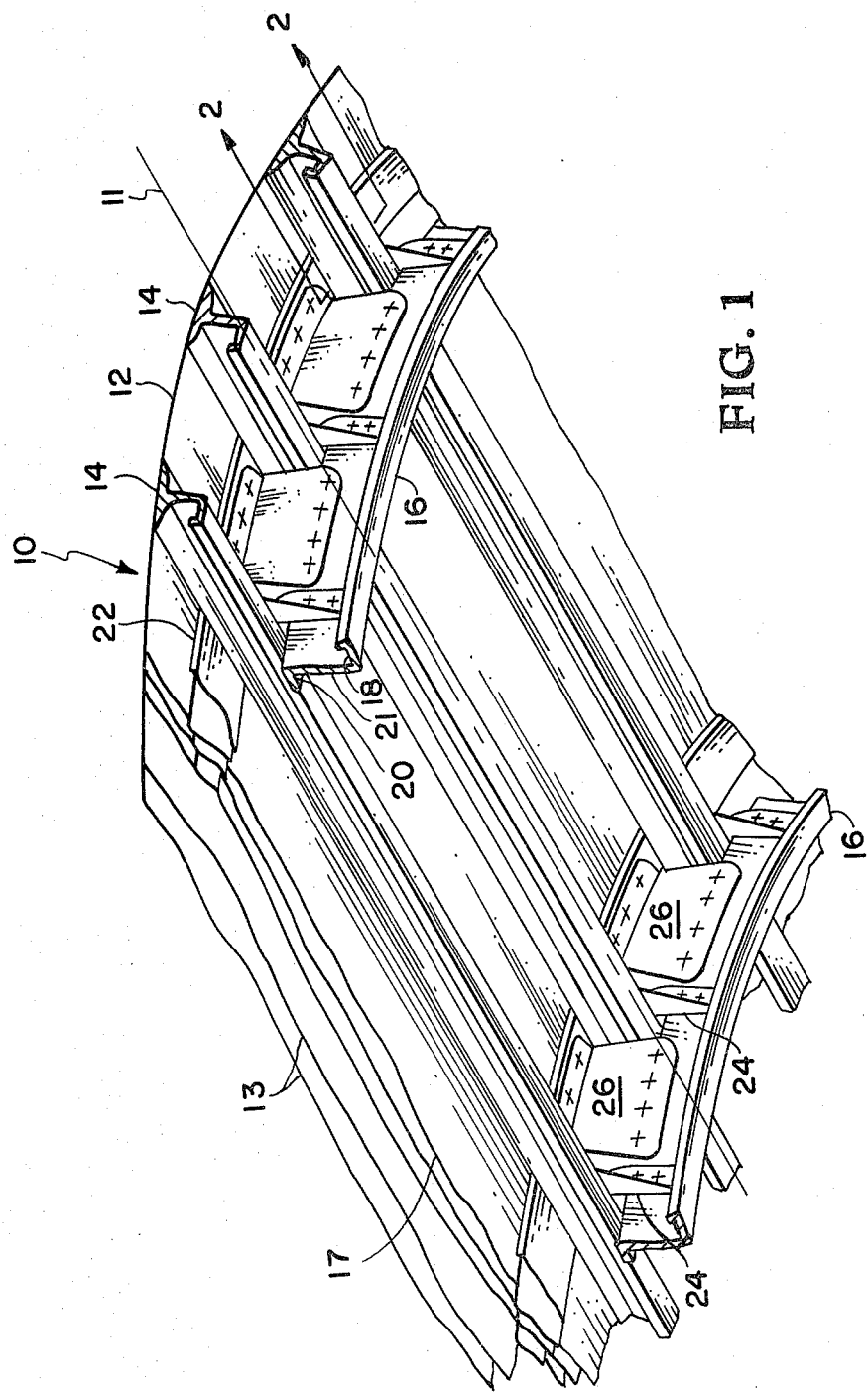
FIG. 1 illustrates a perspective view of a fuselage structure showing the arrangement of the stringers, frames, skins, shear ties, and clips in the preferred embodiment of the invention.

Referring now to the drawings, there is illustrated a preferred embodiment of the present invention as it would be used in the fuselage of a supersonic transport aircraft. FIG. 1 shows a fuselage structure, designated generally by the reference numeral 10, comprised of three major components, the skin 12, stringers 14 and frames 16.

The skin 12 consists of a continuous pair of plies of borsic aluminum 13, a metal matrix composite material, oriented in alternate layers at approximately 45° and approximately 315° to the fuselage longitudinal axis 11. Wide circumferential bands of borsic aluminum composite 17 are located on the skin 12 between the frames 16 and bear the body pressurization loads. The circumferential bands of borsic aluminum composite 17 are oriented at approximately 90° to the fuselage longitudinal axis 11. The skin 12 is consolidated by applying heat and pressure to the borsic aluminum plies 13 and the circumferential bands of borsic aluminum composite 17.

Figure 2:
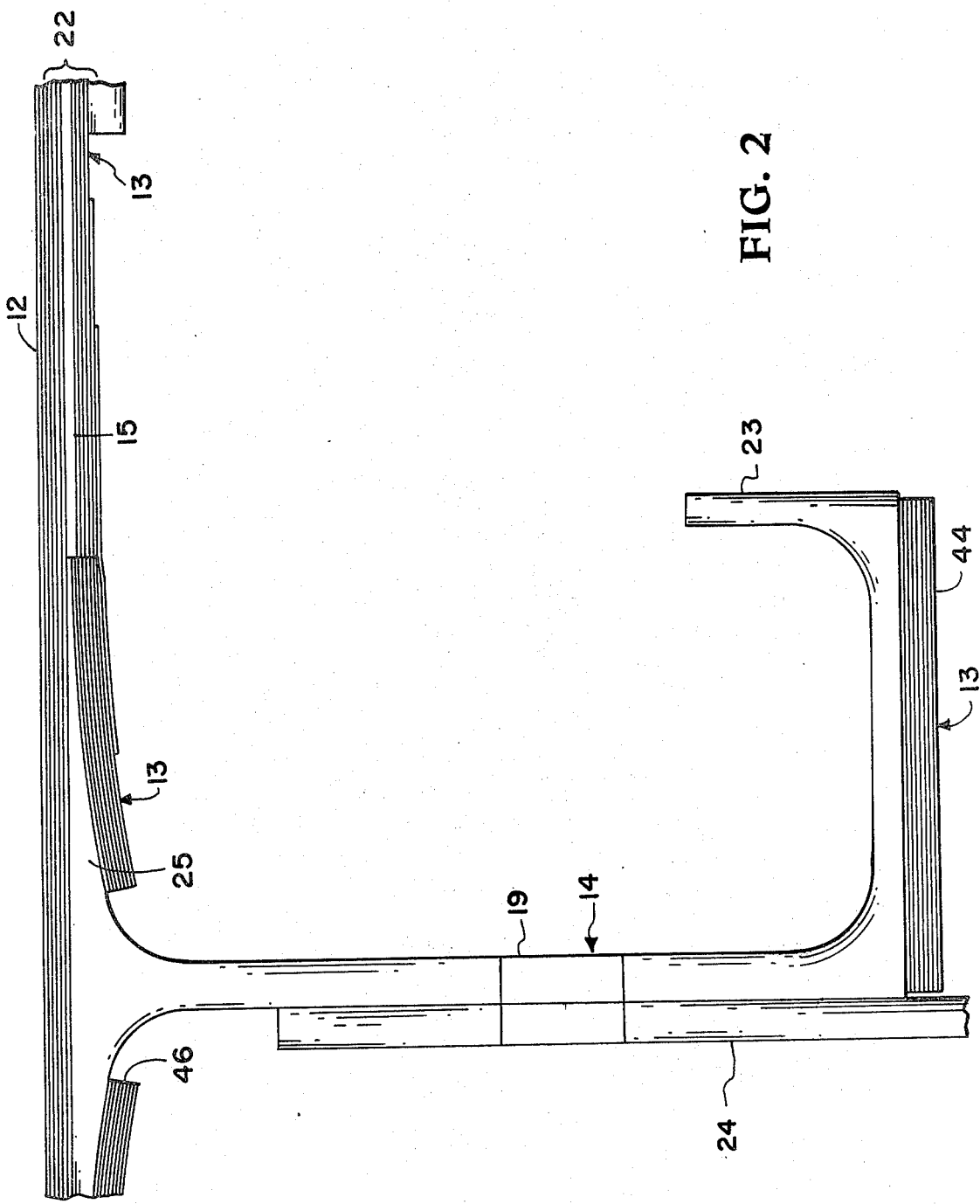
FIG. 2 illustrates a section taken along lines 2—2 of the fuselage shown in FIG. 1.

The stringers, designated generally by the reference number 14, run longitudinally along the fuselage 10 and stabilize and support the skin 12. The stringers 14, as shown in FIG. 2, are machined titanium extrusions 19 with the stringer inboard end 23 reinforced with uniaxial borsic aluminum 44. Stringers of graphite/epoxy or boron/epoxy would also be suitable. The borsic aluminum stringer reinforcement 44 is comprised of layers of borsic aluminum plies 13 oriented at approximately 0° to the fuselage longitudinal axis 11. The stringer outboard end 25 is "T" shaped with the trunk of the "T" being thicker and tapering to thinner portions at the extremities. The inner face of the stringer outboard end 25 is also reinforced with uniaxial borsic aluminum 46. The outboard borsic aluminum stringer reinforcement 46 is also comprised of layers of borsic aluminum plies 13 oriented at approximately 0° to the fuselage longitudinal axis 11. The outboard borsic aluminum stringer reinforcements 46 and the inboard borsic aluminum stringer reinforcements 44 are diffusion bonded to the stringer outboard end 25 and the stringer inboard end 23, respectively. The stringers 14 are attached to the skin 12 by spot brazing which reduces the number of fastener holes required through the skin 12. Tests have shown minimal degradation of borsic material properties by spot brazing. The stringers could also be compacted to the skin.

The frames 16, as shown in FIG. 1, are oriented at approximately 90° to the fuselage longitudinal axis 11. The frames 16 are conventional metal structures of formed titanium sheet and serve to maintain the cross section shape of the fuselage 10. The frames 16 are comprised of an inner generally "U"-shaped channel 18, an outer channel 20, and the web 21 between the two channels. The frame inner channel 18 and the frame outer channel 20 run parallel to the skin 12 and face respectively forward and aft, while the frame web 21 is perpendicular to the skin 12. The frames 16 are loaded in bending, tension and compression.

The stringers 14 are attached to the frames 16 by the use of generally "L"-shaped clips 24. The clips 24 are parallel to the stringers 14 in the area in which they fasten to the stringers 14, and the clips 24 make a 90° bend and are parallel to the frames 16 in the area in which they fasten to the frames 16. The clips 24 are mechanically fastened to both the stringers 14 and the frames 16, by fasteners such as bolts or rivets and are subject to radial loading, by both internal pressure and differential thermal expansion.

A pad 22 has been built up on the skin 12 in the area of the frames 16, between the stringers 14. The pad 22, shown in FIG. 2, is comprised of plies of borsic aluminum 13, in alternating layers oriented at 45° and at 315° to the fuselage longitudinal axis 11, with a core of aluminum shim stock 15. The skin 12 is mechanically fastened to the frames 16 through the pads 22 and shear ties 26.

The shear ties 26 are "L"-shaped members with one edge parallel to the frames 16 and the perpendicular edge parallel to the skin 12 at the pads 22. The shear ties 26 are located between the stringers 14 and carry the shear loads from the skin 12 to the frames 16.

Figure 3:
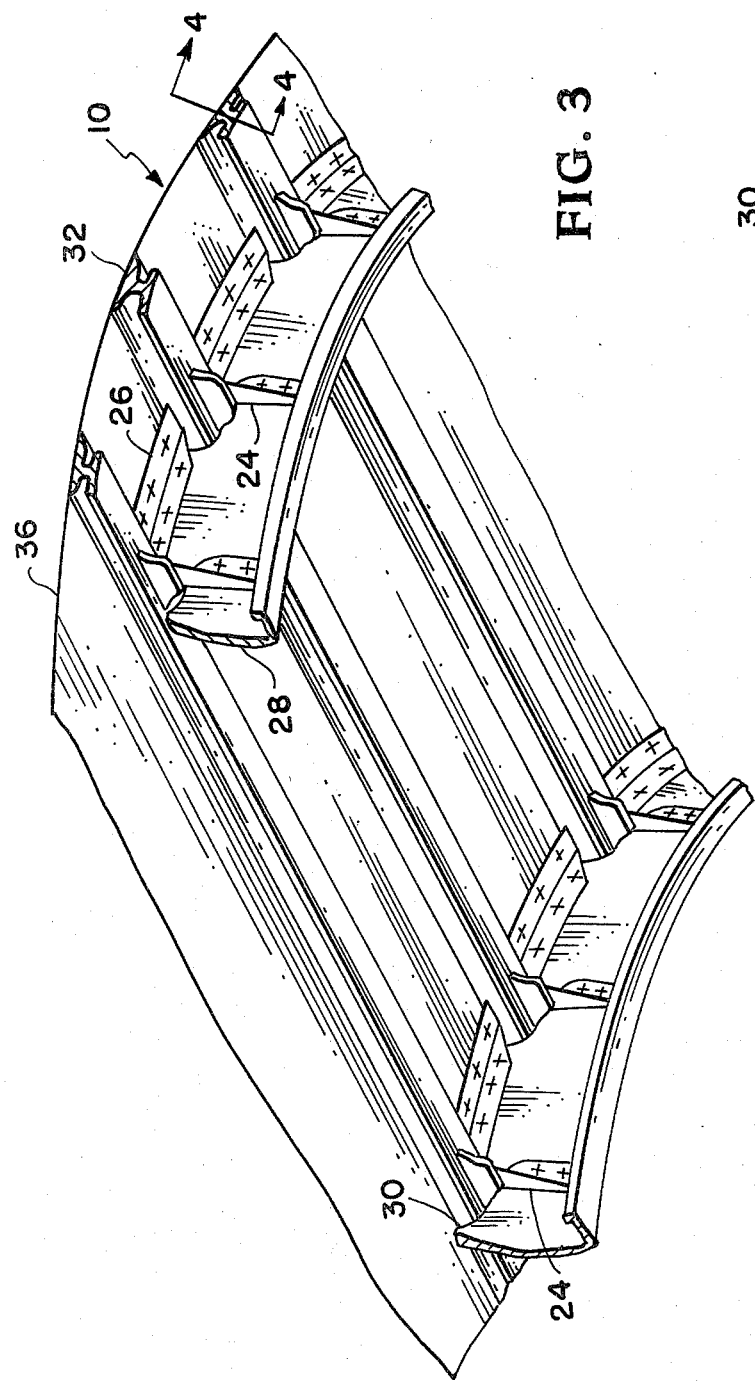
FIG. 3 illustrates a perspective view of a fuselage showing an alternate version of the invention.

FIG. 3 shows an alternate embodiment of the invention in which the stringers 32 are "H"-shaped with one edge of the "H" against the skin 36 and the other edge facing inboard. There are tabs 34 on the stringers 32 in the vicinity of the frames. Clips 24 are mechanically fastened to the tabs 34 and the frames 28. Fastening the clips 24 to tabs 34 on the stringers 32, rather than to the stringer 32 themselves, ensures that there are no fasteners in the highly loaded portion of the stringers 32. The clips 24 in this embodiment are similar to those described in the preferred embodiment above and the stringers 32 are reinforced in a manner similar to that described in the preferred embodiment.

The frames 28 in this embodiment are similar to those described in the preferred embodiment except they are notched to surround the stringers 32, and reach almost to the skin 36. The frames 28 are attached to the skin 36 by shear ties 26 which are described above in the preferred embodiment. This provides high structural efficiency of the frames 28.

Figure 4:
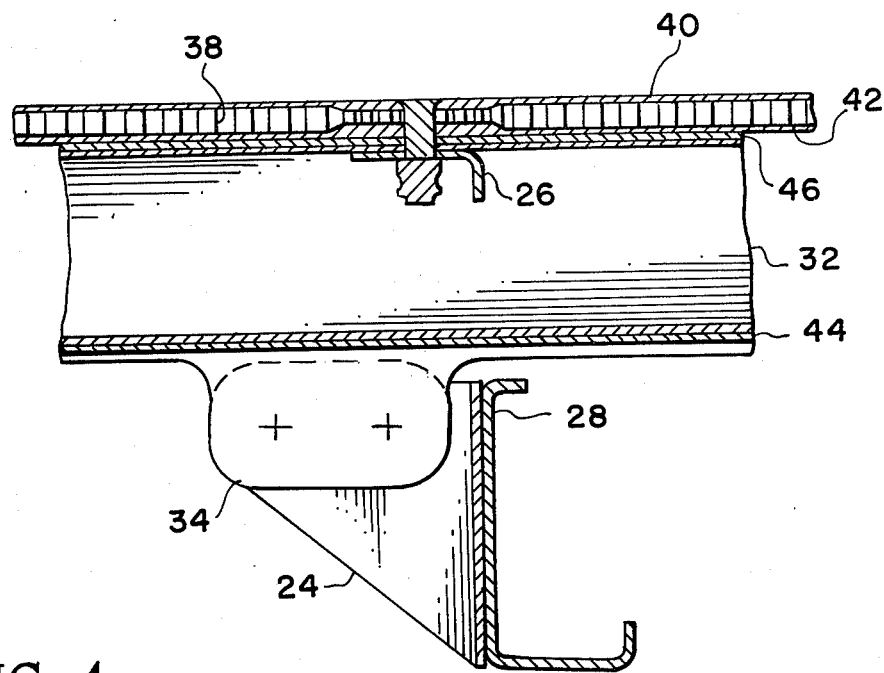
FIG. 4 illustrates a section along lines 4—4 of the fuselage shown in FIG. 3 showing the titanium honeycomb core.

FIG. 4 shows a section view of the skin 36 taken along lines 4—4 of FIG. 3. The skin 36 is comprised of a titanium honeycomb core 38, sandwiched between an inner face sheet of borsic aluminum 42 and an outer face sheet of borsic aluminum 40. The inner face sheet 42 and the outer face sheet 40 are comprised of plies of borsic aluminum built up with the following orientation to the fuselage longitudinal axis 11: 0° ply, 45° ply, 90° ply, 315° ply, 0° ply. The titanium honeycomb core 38 is approximately 1.25 inches in depth to provide skin buckling stability. The inner borsic aluminum face sheet 42 and the outer borsic aluminum face sheet 40 are brazed to the titanium honeycomb core 38. This skin design allows the skin 36 to carry the body pressure and bending loads.

Figure 5:
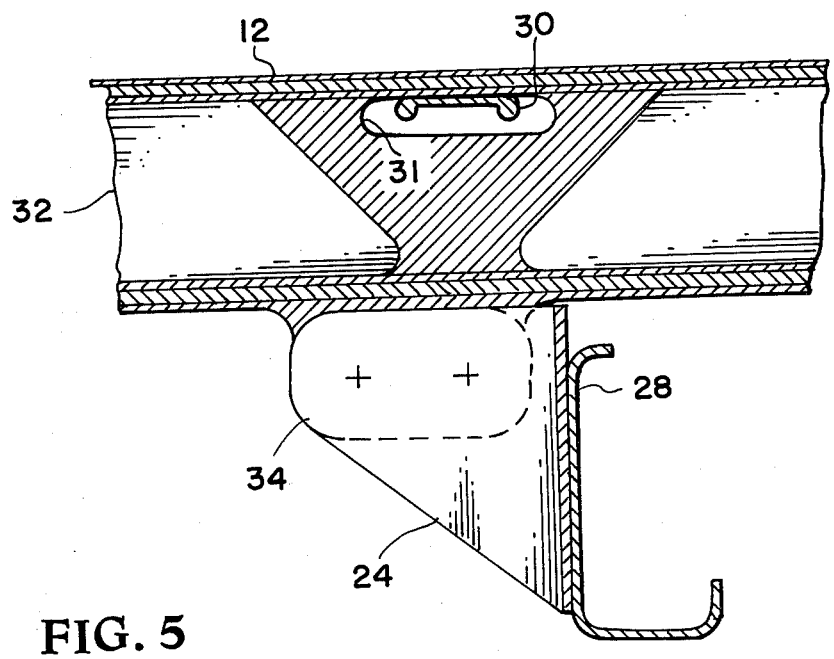
FIG. 5 illustrates a longitudinal sectional view of the fuselage showing an alternate version of the invention in which the frame outer channel consists of a separate composite reinforced metal circumferential strap running through slots in the stringers.

FIG. 5 shows an alternate embodiment of the section shown in FIG. 4. In this embodiment the skin 12 is comprised of layers of borsic aluminum 13 as described in the preferred embodiment. Other members are as described in the alternate embodiment illustrated in FIG. 4 except that the frame outboard channel 30 runs through slots 31 in the stringers 32 and is fastened to the skin 12 through a pad 22, which is described in the preferred embodiment. The frame outboard channel 30 consists of a separate borsic aluminum reinforced metal circumferential strap running through slots 31 in the stringers 32 and provides fail safety for circumferential hoop tension pressure loads. The notches between frame 28, pads 22, and stringers 32 are filleted by aluminum wire to reduce potential fatigue problems.

Figure 6:
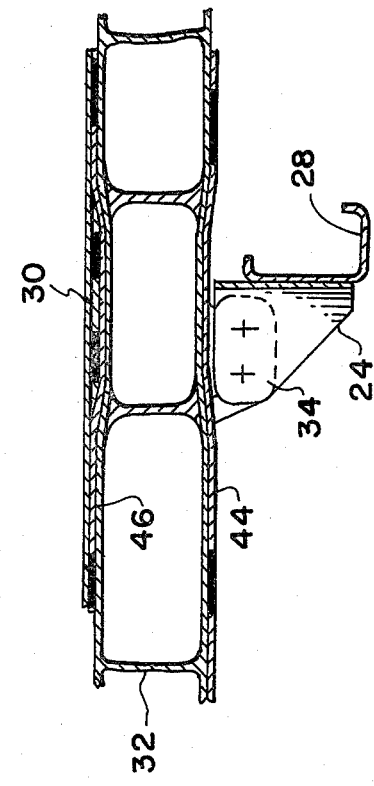
FIG. 6 illustrates a longitudinal sectional view of the fuselage showing an alternate version of the invention in which the frame outer channel is a composite reinforced metal circumferential strap running under a notched section of the stringer.

FIG. 6 is an alternate embodiment of the section shown in FIG. 5. In this embodiment the stringers 32 are notched allowing the stringer 32 to step over the frame outer channel 30, thus providing fail safety for circumferential hoop tension pressure loads while using frames 28 with no structural discontinuities. Other features of the embodiment shown in FIG. 6 are the same as those shown in FIG. 5.

In the preferred embodiment the borsic aluminum skin 12 covers the stringers 14 and gives shape to the fuselage 10. The stringers 14 are members which run longitudinally in the fuselage 10 and stabilize and support the skin 12 between the frames 16. The stringers 14 carry the body bending loads and are loaded primarily in tension and compression. The frames 16 are cross sectionally oriented curved beams which maintain the cross sectional shape of the fuselage 10 and support the stringers 14. The frames 16 are loaded in bending, tension and compression. The high strength to weight ratio of the borsic aluminum plies 13 which comprise the skin 12 and reinforce the stringers 14, results in a fuselage 10 which is significantly lighter than a similar structure of titanium and yet still able to withstand the conditions expected to be encountered by a supersonic transport.

It will be understood that the foregoing descriptions are of the preferred embodiments of the invention and are therefore merely representative. Obviously there are many variations and modifications of the present inventions in light of the preceding teachings. It is therefore to be understood that within the scope of the appended claims the invention may be practiced otherwise than as specifically described.

What is claimed as new and desired to be secured by Letters Patent of the United States is:

1. A fuselage structure comprising:
   a fuselage having a longitudinal axis;
   an external skin of alternate layers of composite material, oriented at a biased angle relative to the longitudinal axis and at approximately 90° to the biased angle;
   stringers, having outboard and inboard ends;
   frames;
   circumferential pads of composite material located on an inner surface of the external skin between said external skin and said frames and oriented at approximately 90° relative to the longitudinal axis;
   first reinforcement means, associated with the outboard ends of the stringers, said first reinforcement means being composite material oriented as approximately 0° relative to the longitudinal axis;
   second reinforcement means, associated with the inboard ends of the stringers, said second reinforcement means being composite material oriented at approximately 0° relative to the longitudinal axis; and
   third reinforcement means associated with the frames and the external skin whereby the frames are fastened to the external skin through the reinforcement means and through shear ties.

2. A fuselage structure as in claim 1 wherein said frame means consists of inner and outer channels and webs between the channels, said frame means being connected to said stringer means, to maintain the cross-sectional shape of the fuselage, wherein the said skin means, stringer means, and frame means are so disposed as to provide maximum continuity to the primarily load-bearing material.

3. A fuselage structure as in claim 1 wherein said external skin is alternate layers of borsic aluminum, oriented at approximately 45° and approximately 315° to the longitudinal axis.

4. A fuselage structure as in claim 3 wherein said stringer means are reinforced with borsic aluminum oriented at approximately 0° to the fuselage longitudinal axis.

5. A fuselage structure as in claim 1 wherein said stringers are brazed to the external skin.

6. A fuselage structure as in claim 1 wherein said stringers are diffusion bonded to the external skin.

7. A fuselage structure as in claim 1 wherein said stringers are compacted to the external skin.

8. A fuselage structure as in claim 1 wherein said stringers are weld brazed to the external skin.

9. A fuselage structure as in claim 1 wherein said third reinforcement means associated with the frames and the external skin is a pad of aluminum shim stock.

10. A fuselage structure as in claim 1 wherein clips fasten the frames to the stringers.

11. A fuselage structure as in claim 10 wherein shear ties fasten said frame means to said skin means.

12. A fuselage structure as in claim 10 wherein said clips are fastened by diffusion bonding to the frames and stringers.

13. A fuselage structure as in claim 10 wherein said clips are fastened by brazing to the frames and stringers.

14. A fuselage structure as in claim 1 wherein said circumferential pads associated with the frames and the external skin is alternate layers of composite material located between the external skin and the frames, oriented at a biased angle relative to the longitudinal axis and at approximately 90° to the biased angle.

15. A fuselage structure as in claim 14 wherein said third reinforcement means associated with the frames and the external skin includes a core of aluminum shim stock.

16. A fuselage structure as in claim 1 wherein said stringers are made of a graphite/epoxy composite.

17. A fuselage structure as in claim 1 wherein said stringers are made of a boron/epoxy composite.

18. A fuselage structure as in claim 1 wherein said stringers are machined titanium extensions.

19. A fuselage structure as in claim 1 wherein said composite material is borsic aluminum.

20. A fuselage structure comprising:
   a fuselage;
   skin means covering said fuselage with metal matrix fiber reinforced composites;
   stringer means; and
   means for reinforcing the connection of said stringer means to said skin means; said reinforcing means attached to and supporting said skin means on said stringer means;
   said fuselage including a frame means consisting of inner and outer channels and webs between the channels, said frame means being connected to said stringer means, to maintain the cross-sectional shape of the fuselage, wherein the said skin means, stringer means, and frame means are so disposed as to provide maximum continuity to the primary load-bearing material;
   said skin means is alternate layers of borsic aluminum, oriented at approximately 0°, approximately 45°, approximately 90°, and approximately 315° to the fuselage longitudinal axis;
   said stringer means being reinforced with borsic aluminum oriented at approximately 0° to the fuselage longitudinal axis;
   clips fastening said frame means to said stringer means and shear ties fastening said frame means to said skin means;
   a pad means of borsic aluminum, oriented in alternate layers at approximately 45° and approximately 315° to the fuselage longitudinal axis, attached to said skin means in the area of the shear ties; and
   the stringer means including tabs in the vicinity of the frame means and clips fastened to said tabs, to attach the stringer means, so that there are no fasteners in the highly loaded portion of the stringer means.

21. A fuselage structure as in claim 20 wherein said skin means includes a honeycomb core, sandwiched between said layers of borsic aluminum.

22. A fuselage structure as in claim 21 wherein said honeycomb core consists of titanium.

23. A fuselage structure as in claim 20 wherein the frame means are notched around said stringer means whereby said frame means extend almost to the skin means and are attached to the skin means by shear ties, providing high structural efficiency of the frame means.

24. A fuselage structure as in claim 23 wherein the frame means has an outer channel consisting of a separate, composite reinforced, metal circumferential strap, running through slots in the stringer means providing fail safety for hoop tension and pressure loads.

25. A fuselage structure as in claim 24 wherein the stringer means are notched, said notch allowing stringer means to step over the frame outer channel.

* * * * *